United States Patent
Reimann et al.

(10) Patent No.: US 11,140,660 B2
(45) Date of Patent: *Oct. 5, 2021

(54) APPARATUS, METHOD AND COMPUTER PROGRAM FOR DETERMINING ONE OR MORE RADIO RESOURCES TO BE USED FOR PERFORMING A WIRELESS COMMUNICATION OVER A SIDELINK OF A MOBILE COMMUNICATION SYSTEM

(71) Applicant: VOLKSWAGEN AKTIENGESELLSCHAFT, Wolfsburg (DE)

(72) Inventors: Daniel Reimann, Braunschweig (DE); Guillaume Jornod, Berlin (DE); Steffen Schmitz, Wesel (DE)

(73) Assignee: Volkswagen Aktiengesellschaft

( * ) Notice: Subject to any disclaimer, the term of this patent is extended or adjusted under 35 U.S.C. 154(b) by 0 days.

This patent is subject to a terminal disclaimer.

(21) Appl. No.: 16/861,605

(22) Filed: Apr. 29, 2020

(65) Prior Publication Data

US 2020/0359360 A1 Nov. 12, 2020

(30) Foreign Application Priority Data

May 6, 2019 (EP) .................................... 19172679

(51) Int. Cl.
*H04W 72/04* (2009.01)
*H04W 84/04* (2009.01)

(52) U.S. Cl.
CPC ............ *H04W 72/04* (2013.01); *H04W 84/04* (2013.01)

(58) Field of Classification Search
CPC .............................. H04W 72/04; H04W 84/04

(Continued)

(56) References Cited

U.S. PATENT DOCUMENTS 9,836,047 B2 * 12/2017 Clark ................... G05D 1/0022
10,498,513 B2 * 12/2019 Marinier ............... H04L 5/0051
(Continued)

FOREIGN PATENT DOCUMENTS

| AU | 2017262847 A1 | 11/2018 |
| EP | 3386256 A1 | 10/2018 |
| WO | 2017165087 A1 | 9/2017 |

OTHER PUBLICATIONS

Huawei; Sidelink resource allocation mode 2 for NR V2X; 3GPP TSG RAN WG1 Meeting #97; May 13-17, 2019; Reno, Nevada, United States of America.

(Continued)

*Primary Examiner* — Nghi H Ly
(74) *Attorney, Agent, or Firm* — Barnes & Thornburg LLP

(57) ABSTRACT

An apparatus, method and computer program for determining one or more radio resources to be used for performing a wireless communication over a sidelink of a mobile communication system. The method includes determining whether a transportation vehicle executing the method is in coverage or out of coverage of a base station of the mobile communication system, selecting one or more methods or mechanisms for improving a transmission reliability of the wireless communication over the sidelink from a group of methods or mechanisms for improving the transmission reliability in response to the transportation vehicle being out of coverage, and determining the one or more radio resources to be used for performing the wireless communication over the sidelink of the mobile communication system using the selected method or mechanism.

27 Claims, 2 Drawing Sheets

(58) Field of Classification Search
USPC .................. 455/450, 422.1, 423, 418, 432.1
See application file for complete search history.

(56) References Cited

U.S. PATENT DOCUMENTS

| | | | |
|---|---|---|---|
| 10,587,371 B2* | 3/2020 | Baldemair | ............ H04L 1/1861 |
| 2016/0295624 A1 | 10/2016 | Novlan et al. | |
| 2017/0331670 A1 | 11/2017 | Parkvall et al. | |
| 2018/0227882 A1 | 8/2018 | Freda et al. | |
| 2019/0014548 A1* | 1/2019 | Pelletier | ............. H04W 52/246 |
| 2020/0344764 A1* | 10/2020 | Reimann | ........... H04W 72/0426 |

OTHER PUBLICATIONS

NTT Docomo; Sidelink resource allocation mechanism for NR V2X; 3GPP TSG RAN WG1 Ad-Hoc Meeting 1901 Jan. 21-25, 2019; Taipai, Taiwan.

Search Report for European Patent Application No. 19172679.3; dated Oct. 14, 2019.

\* cited by examiner

APPARATUS, METHOD AND COMPUTER PROGRAM FOR DETERMINING ONE OR MORE RADIO RESOURCES TO BE USED FOR PERFORMING A WIRELESS COMMUNICATION OVER A SIDELINK OF A MOBILE COMMUNICATION SYSTEM

PRIORITY CLAIM

This patent application claims priority to European Patent Application No. 19172679.3, filed 6 May 2019, the disclosure of which is incorporated herein by reference in its entirety.

SUMMARY

Illustrative embodiments relate to an apparatus, a method and a computer program for determining one or more radio resources to be used for performing a wireless communication over a sidelink of a mobile communication system, more specifically, but not exclusively, to determining the one or more radio resources to be used for performing the wireless communication over the sidelink of a mobile communication system using one or more method or mechanism of a group of methods or mechanisms for improving a transmission reliability of the wireless communication in an out-of-coverage scenario.

BRIEF DESCRIPTION OF THE DRAWINGS

Exemplary embodiments will be described using the following non-limiting embodiments of apparatuses or methods or computer programs or computer program products by way of example only, and with reference to the accompanying figures, in which.

DETAILED DESCRIPTION

Figure 1A:
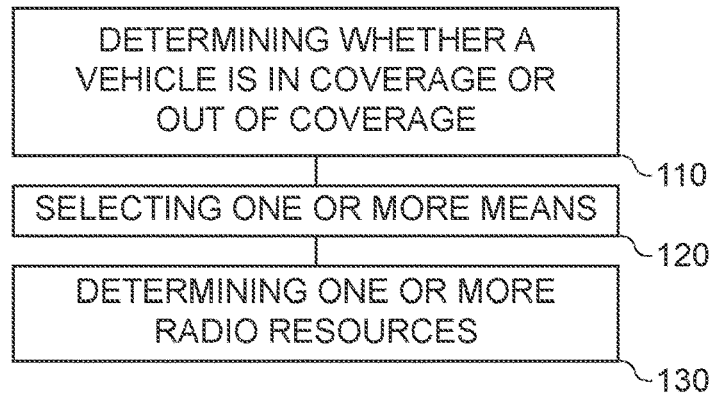
FIGS. 1a and 1b show flow charts of exemplary embodiments of a method for determining one or more radio resources to be used for performing a wireless communication over a sidelink of a mobile communication system.

Vehicular communication is a field of research and development. To enable an autonomous or semi-autonomous driving of the transportation vehicles, transportation vehicles are expected to use Vehicle-to-Vehicle-Communication (V2V) and Vehicle-to-Network (V2N) communication, e.g., to coordinate driving maneuvers and/or to receive tele-operated driving instructions. This communication is generally wireless, i.e., transportation vehicles may wirelessly communicate with other transportation vehicles in their vicinity and/or with backend services via cellular mobile communication systems.

patent application U.S. Ser. No. 15/080,485 A1 relates to a method and an apparatus for resource pool designs to support vehicle communications. In this application, various concepts for direct V2V or D2D communication are disclosed. In the application, pools of wireless resources are used to assign wireless resources to periodic or event-triggered traffic.

Patent application EP 3 386 256 A1 relates to a method for transmitting data via a sidelink. In this application, in an out-of-coverage scenario, a scheduling of wireless resources for sidelink communication may be performed by a terminal for other terminals.

Patent application WO 2017-165087 A1 relates to communications over a sidelink in V2V communications. In this application, listen-before-talk is used, e.g., in conjunction with a fixed or variable contention window.

Patent application AU 2017262847 A1 relates a network architecture, a method and devices for a wireless communication network. The application discloses a multitude of concepts to be used in a 5th generation wireless communication network.

Patent application US 2018/227882 A1 relates to methods, apparatuses and systems for implementing V2V communication via LTE-D2D. In the application, various mechanisms for improving the reliability of the D2D communication are shown.

NTT DOCOMO ET AL: "Sidelink resource allocation mechanism for NR V2X", 3GPP DRAFT; R1-1900965 relates to a discussion on sidelink resource configuration and resource allocation. In the discussion, different sidelink configurations, and their implications on the reliability of transmissions that are based thereupon are shown.

As wireless communication occurs over a shared medium, which may be limited by the availability of radio resources, there may be a desire to provide an improved concept for radio resource management for a wireless communication over a sidelink of a mobile communication system.

Disclosed embodiments are based on the finding that, to increase a usage of available radio resources while maintaining a high transmission success rate, one or more methods or mechanisms for increasing a transmission reliability may be used when a transportation vehicle is (currently or suddenly) in an out-of-coverage scenario. For example, the transportation vehicle detects that it is in an out-of-coverage scenario (i.e., is unable to communicate with any (stationary) base station of the mobile communication system). Based on the detection, the transportation vehicle reverts to using a random access on radio resources that are to be used for sidelink communication. To improve the transmission reliability, the transportation vehicle uses one or more methods or mechanisms, such as frequency interleaving, frequency hopping, forward error correction, Reed-Solomon-Codes etc. to avoid a failure of the wireless transmission. In addition, the transportation vehicle may sense an availability of the wireless resources, and select the method or mechanism based on the sensed availability. For example, in cases, where many radio resources seem to be available, a forward error correction-based approach might be used, as the increased overhead may be inconsequential.

Disclosed embodiments provide a method for determining one or more radio resources to be used for performing a wireless communication over a sidelink of a mobile communication system. The method comprises determining whether a transportation vehicle executing the method is in coverage or out of coverage of a base station of the mobile communication system. The method comprises selecting one or more methods or mechanisms for improving a transmission reliability of the wireless communication over the sidelink from a group of methods or mechanisms for improving the transmission reliability if the transportation vehicle is out of coverage. The method comprises determining the one or more radio resources to be used for performing the wireless communication over the sidelink of the mobile communication system using the selected method or mechanism. This may provide an improved concept for radio resource management for the wireless communication over the sidelink of the mobile communication system.

In at least some disclosed embodiments, the method comprises sensing an availability of radio resources. The one or more methods or mechanisms for improving the transmission reliability of the wireless communication over the sidelink may be selected based on the sensed availability of radio resources. This may enable a situation-specific selection of the one or more methods or mechanisms.

The availability of radio resources may be sensed for a position or trajectory of the transportation vehicle executing the method. This may enable an estimation of the availability of radio resources that takes into account future changes in the availability, e.g., due to pending wireless communication of one or more further transportation vehicles.

For example, the wireless communication over the sidelink of the mobile communication system may be a communication between the transportation vehicle and one or more further transportation vehicles. The method may comprise receiving one or more wireless messages having a content that is indicative of the availability of the radio resources from the one or more further transportation vehicles. This may enable a sensing of available radio resources that is supported by the one or more further transportation vehicles.

In some disclosed embodiments, the group of methods or mechanisms for improving the transmission reliability comprises using an error connection method or mechanism, such as forward error correction or retransmission-based error correction, for the wireless communication over the sidelink. Forward error correction may lead to a higher transmission reliability and fewer retransmissions, albeit at an increased overhead due to redundant data. Retransmission-based error correction may lead to more retransmissions, at a lower general overhead.

For example, the group of methods or mechanisms for improving the transmission reliability may comprise using one of Reed-Solomon codes, Bose-Chaudhuri-Hocquenghem-Codes, polar codes and Reed-Muller-Codes for the wireless communication over the sidelink. Such codes may provide forward error correction of the wireless communication.

Alternatively or additionally, the group of methods or mechanisms for improving the transmission reliability may comprise using resource hopping, such as frequency hopping and/or resource block hopping, as implemented in the BLUETOOTH® protocol, for the wireless communication over the sidelink, e.g., using Frequency Hopping Spread Spectrum (FHSS). Resource-hopping-based wireless communication may be highly resistant to narrowband interference.

In some disclosed embodiments, the group of methods or mechanisms for improving the transmission reliability comprises using frequency interleaving for the wireless communication over the sidelink. Again, frequency interleaving may be used to avoid failure of the wireless communication due to narrowband interference.

In general, the group of methods or mechanisms for improving the transmission reliability may comprise using listen-before-talk for the wireless communication over the sidelink. This may avoid collisions with simultaneously occurring wireless transmissions.

In some disclosed embodiments, the group of methods or mechanisms for improving the transmission reliability comprises using a vehicle-specific random seed to determine the one or more radio resources. The random seed may be chosen such that an even distribution across the available radio resources is achieved.

The wireless communication over the sidelink of the mobile communication system may be a communication between the transportation vehicle and one or more further transportation vehicles. For example, the mobile communication system may be a vehicular mobile communication system. Vehicular communication may greatly benefit from disclosed embodiments, as out of coverage scenarios are a part of vehicular communication.

For example, the wireless communication may be one of intra-cluster communication, inter-cluster communication, intra-platoon communication and inter-platoon communication between the transportation vehicle and the one or more further transportation vehicles. Such types of wireless communication may greatly benefit from disclosed embodiments, as they may be performed in out-of-coverage scenarios and as they may have stringent reliability and/or delay requirements.

In various disclosed embodiments, the one or more methods or mechanisms for improving the transmission reliability of the wireless communication over the sidelink from the group of methods or mechanisms for improving the transmission reliability are forgone if the transportation vehicle is in coverage of a base station of the mobile communication system. In an in-coverage scenario, the wireless communication may be scheduled by a (stationary) base station of the mobile communication system.

Disclosed embodiments further provide a computer program having a program code for performing the method, when the computer program is executed on a computer, a processor, or a programmable hardware component.

Disclosed embodiments further provide an apparatus for determining one or more radio resources to be used for performing a wireless communication over a sidelink of a mobile communication system. The apparatus comprises an interface for communicating in the mobile communication system. The apparatus comprises a control module configured to determine whether a transportation vehicle comprising the apparatus is in coverage or out of coverage of a base station of the mobile communication system. The control module is configured to select one or more methods or mechanisms for improving a transmission reliability of the wireless communication over the sidelink from a group of methods or mechanisms for improving the transmission reliability if the transportation vehicle is out of coverage. The control module is configured to determine the one or more radio resources to be used for performing the wireless communication over the sidelink of the mobile communication system using the selected method or mechanism.

Various example disclosed embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, disclosed embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosed embodiments. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted similarly.

The terminology used herein is for the purpose of describing disclosed embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1B:
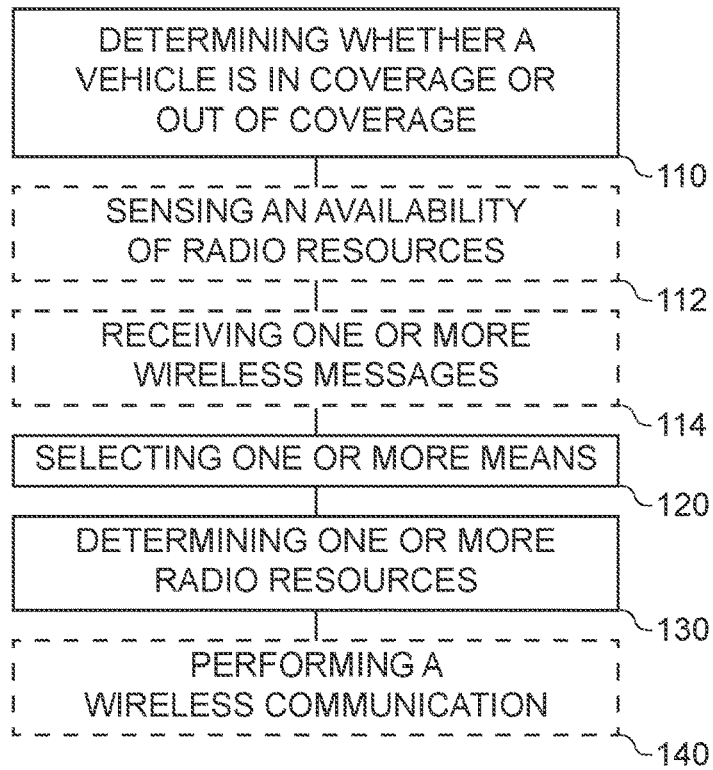

FIGS. 1a and 1b show flow charts of disclosed embodiments of a method for determining one or more radio resources to be used for performing a wireless communication over a sidelink of a mobile communication system 300. The method comprises determining 110 whether a transportation vehicle 100 executing the method is in coverage or out of coverage of a base station of the mobile communication system 300. The method comprises selecting 120 one or more methods or mechanisms for improving a transmission reliability of the wireless communication over the sidelink from a group of methods or mechanisms for improving the transmission reliability if the transportation vehicle 100 is out of coverage. The method further comprises determining 130 the one or more radio resources to be used for performing the wireless communication over the sidelink of the mobile communication system 300 using the selected method or mechanism. As indicated above, the method may be executed by the transportation vehicle 100.

Figure 1C:
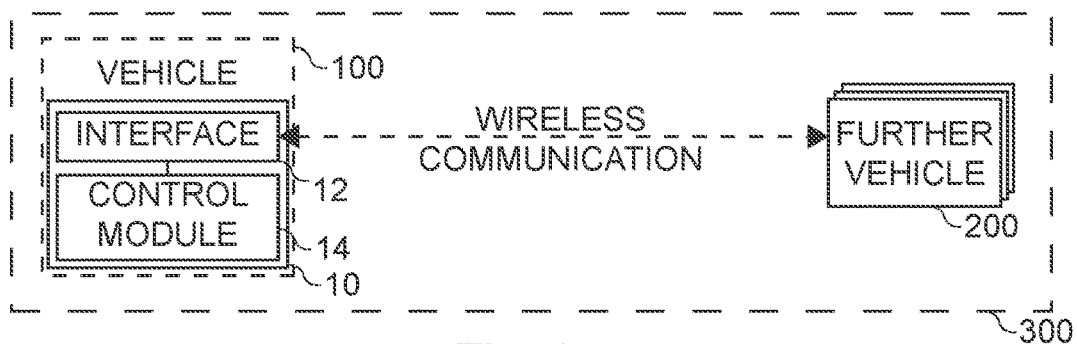
FIG. 1c shows a block diagram of an exemplary embodiment of an apparatus for determining one or more radio resources to be used for performing a wireless communication over a sidelink of a mobile communication system.

FIG. 1c shows a block diagram of an exemplary embodiment of a (corresponding) apparatus 10 for determining the one or more radio resources to be used for performing the wireless communication over the sidelink of the mobile communication system 300. The apparatus 10 comprises an interface 12 for communicating in the mobile communication system 300. The apparatus 10 comprises a control module 14 that is coupled to the interface 12. The control module 14 may be configured to execute the method introduced in connection with FIGS. 1a and/or 1b, e.g., in conjunction with the interface 12. For example, the control module 14 is configured to determine whether the transportation vehicle 100 comprising the apparatus is in coverage or out of coverage of the base station of the mobile communication system 300 (e.g., via the interface 12). The control module 14 is configured to select the one or more methods or mechanisms for improving the transmission reliability of the wireless communication over the sidelink from the group of methods or mechanisms for improving the transmission reliability if the transportation vehicle 100 is out of coverage. The control module is configured to determine the one or more radio resources to be used for performing the wireless communication over the sidelink of the mobile communication system 300 using the selected method or mechanism. FIG. 1c further shows the transportation vehicle 100 comprising the apparatus 10. FIG. 1c further shows the mobile communication system 300 comprising the transportation vehicle 100 and the one or more further transportation vehicles 200.

The following description relates both to the method of FIGS. 1a and/or 1b and to the apparatus 10 of FIG. 1c.

Disclosed embodiments provide a method, an apparatus and a computer program for determining one or more radio resources to be used for performing a wireless communication over the sidelink of a mobile communication system 300. Disclosed embodiments may be used to improve the transmission reliability of the wireless communication over the sidelink in an out-of-coverage scenario, as in such cases, a scheduling of the wireless communication by a stationary base station of the mobile communication system might not be available. Instead, various methods or mechanisms may be employed that increase the transmission reliability of the wireless communication, e.g., to avoid retransmissions. In disclosed embodiments, the wireless communication may be control instructions that are transmitted between the transportation vehicle and the one or more further transportation vehicles, e.g., cluster-related control instructions or platoon-related control instructions.

In some disclosed embodiments, the method apparatus and computer program might only be used in an out-of-coverage scenario. Alternatively, the method, apparatus and computer program may be used both in- and out-of-coverage. For example, the one or more radio resources may comprise one or more elements of the group of a frequency resource, a time resources, a code resource and a spatial resources. In general, in mobile communication system, a concept denoted "resource blocks" is used. A resource block may correspond to a radio resource that spans a pre-defined period of time (e.g., a slot of a physical layer frame of a frame structure of the mobile communication system) and a frequency range (e.g., a portion of a frequency range being used by the mobile communication system). For example, in LTE (Long Term Evolution, a mobile communication system), a resource block is 180 kHz wide in frequency, and 1 slot long in time. In some cases, other parameters, such as a code resource or a spatial resource, may be further used to define a resource block. In disclosed embodiments, the one or more radio resources to be used for performing a wireless communication over the sidelink of the mobile communication system may be one or more resource blocks of the mobile communication system.

In general, the mobile communication system 300 may for example, correspond to one of the Third Generation Partnership Project (3GPP)-standardized mobile communication networks, where the term mobile communication system is used synonymously to mobile communication network. The mobile or wireless communication system may correspond to, for example, a 5th Generation system (5G), a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

The wireless communication over the sidelink of the mobile communication system 300 may be a communication between the transportation vehicle 100 and the one or more further transportation vehicles 200. For example, the transportation vehicle 100 and the one or more further transportation vehicles may be part of a cluster or platoon, e.g., of the same cluster or platoon, or of different clusters or platoons. Accordingly, the wireless communication over the sidelink of the mobile communication system may be one of intra-cluster communication, inter-cluster communication, intra-platoon communication and inter-platoon communication between the transportation vehicle 100 and the one or more further transportation vehicles 200. Accordingly, the mobile communication system 300 may be a vehicular mobile communication system 300.

In at least some disclosed embodiments, the mobile communication system may be a vehicular communication system, e.g., a vehicle-to-network (V2N) or vehicle-to-vehicle (V2V) communication system. For example, the mobile communication system may be or may be based on a C-V2X (Cellular-Vehicle-to-Anything, which may comprise Long Term Evolution Vehicle-to-Anything, LTE-V2X, and 5th generation mobile communication system V2X, 5G-V2X) mobile communication system. The mobile communication system may support two communication modes: PC5, which is used between transportation vehicles, and Uu, which is used between transportation vehicles and base stations. Using PC5 and Uu, the mobile communication system may support direct vehicle-to-vehicle communication (without involvement of a base station as a communication hop, using PC5, either managed by the base station or autonomously), vehicle-to-vehicle communication via a base station of the mobile communication system, and vehicle-to-network communication via a base station of the mobile communication system. In disclosed embodiments, the wireless communication over the sidelink may be based on PC5, and may be a form of direct vehicle-to-vehicle communication.

The method comprises determining 110 whether the transportation vehicle 100 is in coverage or out of coverage of a base station of the mobile communication system 300. In the context of this application, the terms "being in coverage of a base station of the mobile communication system" or "in coverage scenario" may correspond to the transportation vehicle performing the method being associated with, camped on, or registered with a base station of the mobile communication system, i.e., the transportation vehicle performing the method is at that point in time capable of receiving control instructions from the base station of the mobile communication system. In the context of this application, the terms "being out of coverage of a base station of the mobile communication system" or "out-of-coverage scenario" may correspond to the transportation vehicle performing the method being (temporarily) unable to receive control instructions from a (i.e., any) base station of the mobile communication system. Consequently, the determining 110 whether the transportation vehicle 100 is in coverage or out of coverage of a base station may comprise determining, whether the transportation vehicle 100 is able to receive control instructions from a/any base station of the mobile communication system 300.

The method comprises selecting 120 one or more methods or mechanisms for improving a transmission reliability of the wireless communication over the sidelink from a group of methods or mechanisms for improving the transmission reliability if the transportation vehicle 100 is out of coverage. For example, methods or mechanisms of the group of methods or mechanisms for improving the transmission reliability may be methods or mechanisms that aim at reducing an impact of collisions of wireless transmissions, e.g., by adding redundancy that allows decoding of the wireless communication even if a part of the wireless communication is distorted by another wireless transmission.

For example, the group of methods or mechanisms for improving the transmission reliability may comprise using an error-correction method or mechanism, such as forward error correction or retransmission-based error correction, for the wireless communication over the sidelink. In forward error correction, the wireless communication is enhanced with redundancy (i.e., redundant data) that is to be used to reconstruct missing or distorted portions of the wireless communication at the receiver, e.g., without requiring retransmissions. In other words, before transmission, the redundancy may be added to the wireless communication. At the receiver, the wireless communication may be decoded, and missing/distorted parts of the wireless communication may be recovered using the redundancy. For example, the forward error correction may be based on Reed-Solomon-Codes. In other words, the group of methods or mechanisms for improving the transmission reliability may comprise using one of Reed-Solomon codes, Bose-Chaudhuri-Hocquenghem-codes (BCH codes), Reed-Muller-Codes, Walsh-Hadamard codes and polar codes for the wireless communication over the sidelink. When using Reed-Solomon-Codes, the wireless communication is segmented into a plurality of symbols, with each symbol being a finite field element. Each symbol has a length of n bits, so that the symbol is a finite field element of $GF(2n)$, with padding applied so each symbol has the same length. By adding t additional symbols, denoted check symbols, a Reed-Solomon code can be used to detect up to t erroneous symbols, and to repair up to t/2 symbols. BCH codes are also generated over the finite field, and can be designed to correct multiple bit errors. Reed-Muller-codes are a generalization of Reed-Solomon codes and Walsh-Hadamard codes, and are a form of linear block codes. Polar codes are linear block error correcting codes, which are based on a multiple recursive concatenation of a short kernel code that transforms a physical channel into virtual outer channels.

In various disclosed embodiments, the group of methods or mechanisms for improving the transmission reliability may comprise using resource hopping, such as frequency hopping and/or resource block hopping, for the wireless communication over the sidelink, using frequency interleaving for the wireless communication over the sidelink, and/or using random hopping for the wireless communication over the sidelink.

In frequency interleaving, the wireless communication may be spread up and transmitted via at least two (non-adjacent) frequency bands, e.g., to avoid losing the entire transmission due to a narrowband source of interference. This way, at least a part of the wireless communication may be transmitted without errors, so that, in many cases, the wireless communication can be recovered using forward error correction.

In frequency hopping (a form of frequency spreading), e.g., as employed by Frequency-Hopping Spread Spectrum, a signal, such as the wireless communication rapidly changes ("hops") among a plurality of frequencies in a pre-determined order. For example, in a resource-block-based mobile communication system, the wireless communication may rapidly switch among various frequency bands on a per-resource-block basis, e.g., to avoid losing more than the data of a single resource block (also denoted "resource block hopping"). The sequence of frequencies being used in frequency hopping, i.e., the spreading code, may be generated by a pseudo-random generator, and may be specific to the terminal, e.g., the transportation vehicle. The sequence may be a deterministic spreading sequence or a random spreading sequence, e.g., a random spreading sequence in case of FHSS. Therefore, FHSS-based frequency hopping may also be denoted random hopping. Alternatively, other spread spectrum-based transmission techniques may be used for the wireless communication, e.g., Direct Sequence Spread Spectrum (DSSS).

In some disclosed embodiments, the group of methods or mechanisms for improving the transmission reliability comprises using a vehicle-specific random seed to determine the one or more radio resources. For example, a resource pool of radio resources may be used for determining the one or more radio resources to be used for the wireless communication over the sidelink. Instead of purely randomly selecting the one or more radio resources from the pool of radio resources, each transportation vehicle may be assigned a vehicle-specific unique identifier that may be used as a seed in the random selection. By using a seed-based random selection algorithm that spreads over the radio resources of the pool of radio resources, the one or more radio resources may be determined using the seed-based random selection algorithm and using the vehicle-specific, unique identifier as seed to the seed-based random selection algorithm. In some disclosed embodiments, the vehicle-specific random seed may be intrinsic to the transportation vehicle, e.g., calculated based on a serial number of the transportation vehicle. Alternatively, the transportation vehicle-specific random seed may be assigned by the mobile communication system.

The group of methods or mechanisms for improving the transmission reliability may further comprise using listen-before-talk to determine the one or more radio resources, and/or to adjust the determination of the one or more radio resources. When using listen-before-talk, the transportation vehicle performing the method may sense a radio environment and select the radio resources to be used for the wireless communication based on the sensing of the environment. For example, the entity performing the method may sense whether another wireless communication occurs at radio resources that have been previously determined, and postpone the wireless transmission until the other wireless communication has ended.

The one or more methods or mechanisms are selected from the group of methods or mechanisms, e.g., to improve the transmission reliability of the wireless communication over the sidelink. In some disclosed embodiments, the one or more methods or mechanisms may be selected based on a rulebook, e.g., a based on a rulebook that defines which of the methods or mechanisms are to be selected in which situation. For example, the one or more methods or mechanisms may be selected based on communication type or based on a prioritization of the wireless communication. For example, for periodic communication, fewer or different methods or mechanisms may be selected than for communication related to intra-platoon coordination. In other words, the one or more methods or mechanisms may be selected based on a required transmission reliability of the wireless communication, which may be different for different types of communication.

Additionally or alternatively, the one or more methods or mechanisms may be selected based on an amount of wireless communication occurring in the vicinity of the transportation vehicle and/or based on an interference situation in a vicinity of the transportation vehicle. For example, in out-of-coverage situations with only sporadic transmissions, the risk of collision may be low, while a high proportion of the radio resources may be available, so one or more methods or mechanisms may be chosen that carry a high overhead (e.g., due to redundancy). Accordingly, the method may comprise sensing 112 an availability of radio resources. For example, the sensing of the availability of radio resources may comprise estimating a proportion of unused radio resources. The one or more methods or mechanisms may be selected based on the estimated proportion of unused radio resources. Additionally or alternatively, the sensing of the availability of radio resources may comprise detecting periodic transmissions. The one or more methods or mechanisms may be selected based on the detected periodic transmission, e.g., by selecting methods or mechanisms that take into account time resources that carry a heightened probability of collision. Additionally or alternatively, the sensing of the availability of radio resources may comprise estimating an interference level or an interference distribution of a wireless environment of the transportation vehicle. The one or more methods or mechanisms may be selected based on the estimated interference level or interference distribution, e.g., by selecting methods or mechanisms that mitigate failures due to specific types or sources of interference. For example, the level of interference may be indicative of an amount of interference the wireless communication over the sidelink of the mobile communication system is predicted to be subject to. The interference distribution may be indicative of a periodicity or of a frequency (range) of the interference. The one or more methods or mechanisms for improving the transmission reliability of the wireless communication over the sidelink may be selected based on the sensed availability of radio resources. The availability of radio resources may be sensed for a position or trajectory of the transportation vehicle 100 executing the method and/or for a position or trajectory of the one or more further transportation vehicles 200.

In at least some disclosed embodiments, the availability of the radio resources may be sensed by the transportation vehicle 100, e.g., using a wireless transceiver of the transportation vehicle 100. For example, the sensing 112 of the availability of the radio resources may be performed by listening in the wireless spectrum, e.g., to detect transmissions. Additionally or alternatively, the sensing of the availability of the radio resources may comprise predicting a communication of further terminals of the mobile communication system, e.g., of the one or more further transportation vehicles or of other terminals. For example, the method may comprise receiving 114 one or more wireless messages having a content that is indicative of the availability of the radio resources from the one or more further transportation vehicles. The sensing 112 of the availability of the radio resources may be based on the received one or more wireless messages.

For example, the one or more wireless messages may comprise one or more environmental perception messages, i.e., Collective Perception Messages (CPM), comprising environmental perception data. For example, the environmental perception data may comprise modeling information for an area surrounding the one or more second transportation vehicles. The modeling information may relate to objects that have been identified by a transportation vehicle of the one or more further transportation vehicles, using one or more perception sensors of the transportation vehicle. For example, the one or more perception sensors of the transportation vehicles may comprise at least one of a RADAR (Radio Detection and Ranging) sensor, a LIDAR (Light Detection and Ranging) sensor, a camera sensor and an ultrasound sensor. For example, an environmental perception model of the environmental perception data may comprise information related to a location and/or of an extent of the objects that have been identified by the respective transportation vehicle using one or more perception sensors of the respective transportation vehicle. Among the objects may, e.g., be other transportation vehicles. The method may comprise identifying one or more transportation vehicles among the objects that have been identified by the respective transportation vehicle, and estimating the availability of the wireless resources based on the identified transportation vehicles, e.g., by estimating an amount and/or timing of a communication of the identified transportation vehicles. Additionally, the environmental perception data may indicate locations where natural barriers may influence wireless communication, e.g., by shadowing a location or by creating reflections that influence the level of interference. Accordingly, the method may comprise estimating the availability of radio resources (e.g., due to shadowing) based on natural barriers perceived through the environmental perception data that influence wireless communication.

Furthermore, the one or more wireless messages may comprise one or more maneuver coordination messages (MCM). Maneuver coordination messages may comprise information related one or more planned maneuvers of the one or more further transportation vehicles, such as lane changes, brake applications etc., that are coordinated among the transportation vehicles. Each maneuver may be associated with a specific communication pattern. Accordingly, the method may comprise estimating the availability of the radio resources based on the specific communication patterns of one or more maneuvers based on the one or more maneuver coordination massage, e.g., by predicting when and using which radio resources the communication of the one or more further transportation vehicles is likely to take place.

The method comprises determining 130 the one or more radio resources to be used for performing the wireless communication over the sidelink of the mobile communication system 300 using the selected method or mechanism. When determining the one or more radio resources to be used for the wireless communication, the one or more radio resources may be randomly selected from pre-defined radio resources. The pre-defined radio-resources may comprise a pool of available radio resources, and the one or more radio resources may be (randomly) selected from the pool of available radio resources. In at least some disclosed embodiments, the pre-defined radio-resources may be pre-defined by a base station of the mobile communication system. For example, the pre-defined radio resources may be pre-defined using semi-persistent scheduling (SPS). For example, before the entity/transportation vehicle that executes the method leaves a coverage area of the base station, the base station may provide information related to the pre-defined radio-resources to the entity/transportation vehicles, for use in an out-of-coverage situation. In some cases, the pre-defined radio resources may be specific to the entity/transportation vehicle, or specific to a platoon of transportation vehicles or cluster of transportation vehicles comprising the transportation vehicle. Alternatively, the pre-defined radio resources may be the same for (all) entities communicating via the sidelink of the mobile communication system. In at least some disclosed embodiments, the pre-defined radio resources might not be received from a base station, but might be implicit to the mobile communication system, e.g., to be used in an out-of-coverage scenario. For example, the one or more radio resources may be selected from the pre-defined radio resources based on the radio resources selected by the one or more methods or mechanisms, e.g., using the frequency resources selected using frequency hopping or frequency interleaving. Additionally or alternatively, the one or more radio resources may be selected based on the amount of data to be transmitted in the wireless communication using the one or more methods or mechanisms, e.g., including redundancy added by the one or more methods or mechanisms.

In disclosed embodiments, the one or more methods or mechanisms might (only) be used in an out-of-coverage scenario. The one or more methods or mechanisms might not be used when the transportation vehicle performing the method is in coverage of a base station of the mobile communication system 300. In other words, the one or more methods or mechanisms for improving the transmission reliability of the wireless communication over the sidelink may be forgone if the transportation vehicle 100 is in coverage of a base station of the mobile communication system 300.

In at least some disclosed embodiments, the method comprises performing 140 the wireless communication over the sidelink of the mobile communication system based on the determined one or more radio resources. For example, the method may comprise using the one or more radio resources for the wireless communication over the sidelink of the mobile communication system.

The interface 12 may correspond to one or more inputs and/or outputs for receiving and/or transmitting information, which may be in digital (bit) values according to a specified code, within a module, between modules or between modules of different entities. The interface is configured to communicate in the mobile communication system. In other words, the interface 12 may be or comprise a wireless transceiver for communicating in the mobile communication system. The wireless transceiver may be implemented as any method or mechanism for transceiving, i.e., receiving and/or transmitting etc., one or more transceiver units, one or more transceiver devices and it may comprise typical receiver and/or transmitter components, such as one or more elements of the group of one or more Low-Noise Amplifiers (LNAs), one or more Power Amplifiers (PAs), one or more filters or filter circuitry, one or more diplexers, one or more duplexers, one or more Analog-to-Digital converters (A/D), one or more Digital-to-Analog converters (D/A), one or more modulators or demodulators, one or more mixers, one or more antennas, etc.

In disclosed embodiments the control module 14 may be implemented using one or more processing units, one or more processing devices, any method or mechanism for processing, such as a processor, a computer or a programmable hardware component being operable with accordingly adapted software. In other words, the described function of the control module 14 may as well be implemented in software, which is then executed on one or more programmable hardware components. Such hardware components may comprise a general-purpose processor, a Digital Signal Processor (DSP), a micro-controller, etc.

In at least some disclosed embodiments, the transportation vehicle and/or the one or more further transportation vehicles may be connected transportation vehicles, i.e., autonomous transportation vehicles or semi-autonomous road users transportation vehicles that are configured to communicate with other transportation vehicles or with a backend server to make their driving decisions. For example, the transportation vehicle and/or the one or more further transportation vehicles may be transportation vehicles that are configured to coordinate their autonomous or semi-autonomous driving with other transportation vehicles. In the context of this application, the transportation vehicle performing the method may correspond to the transportation vehicle comprising the apparatus.

The one or more further transportation vehicles and the transportation vehicle may form a cluster of transportation vehicles or may be members of clusters of transportation vehicles. For example, in a cluster of transportation vehicles, members of the cluster may share information, and may drive in a coordinated way. Within a cluster, a group of transportation vehicles may coordinate driving maneuvers. Among the transportation vehicles of the cluster, cellular vehicle-to-vehicle communication (i.e., intra-cluster communication) may be used to coordinate the cluster. A cluster of transportation vehicles may comprise a cluster head, i.e., a transportation vehicle that coordinates a communication of the cluster of transportation vehicles. For example, the transportation vehicle executing the method may be the cluster head of the cluster of transportation vehicles.

Alternatively, the one or more further transportation vehicles and the transportation vehicle may form a platoon of transportation vehicles or may be members of platoons of transportation vehicles. Grouping transportation vehicles into platoons is an approach for increasing the capacity of roads. Within a platoon, a group of transportation vehicles may be coordinated to accelerate or break simultaneously, allowing for smaller distances between the transportation vehicles. Among the transportation vehicles of the platoon, cellular vehicle-to-vehicle communication may be used to coordinate the platoon of transportation vehicles. A platoon of transportation vehicles may comprise a platoon leader, i.e., a transportation vehicle that determines and controls a velocity and heading of the platoon of transportation vehicles and that transmits and initiates an execution of driving instructions to be executed by transportation vehicles of the platoon of transportation vehicles. The platoon leader may lead the platoon of transportation vehicles. For example, the platoon leader may drive in front of the other transportation vehicles of the platoon of transportation vehicles. In some disclosed embodiments, the transportation vehicle executing the method may be the platoon leader. For example, if the platoon of transportation vehicles is to change lanes on the road or is to perform other driving maneuvers, these maneuvers are initiated by the platoon leader and transmitted to the other transportation vehicles of the platoon of transportation vehicles. In some disclosed embodiments, leadership in a platoon of transportation vehicles might not be bounded to an individual transportation vehicle. For example, the platoon of transportation vehicles might be coordinated by a central entity (e.g., a "cloud" entity) or the leading function may be distributed over a plurality of transportation vehicles. For example, the platoon may comprise a communication manager, i.e., a transportation vehicle that coordinates an inter-platoon communication and/or a communication with transportation vehicles or entities outside the platoon. In some cases, e.g., if the platoon of transportation vehicles is coordinated by a single transportation vehicle, the platoon leader may be the communication manager of the platoon. Alternatively, in a platoon with a distributed leading function, a transportation vehicle being the communication manager may be different from a transportation vehicle that initiates an execution of driving instructions to be executed by transportation vehicles of the platoon of transportation vehicles. For example, the transportation vehicle and/or the other transportation vehicles of the platoon of transportation vehicles may be motorized transportation vehicles, e.g., automobiles, trucks, lorries or motorcycles.

At least some disclosed embodiments focus on an approach on how to organize resources between two or more transportation vehicles in PC5 in an (sudden) out-of-coverage situation, e.g., at an intersection. In a first approach, a method or mechanism for organizing the resources may be selected among a) Sidelink random access b) Predefined Resource Blocks c) One transportation vehicle acts as base station/eNodeB (enhanced Node B, a base station concept in LTE-based mobile communication systems).

Figure 2A:
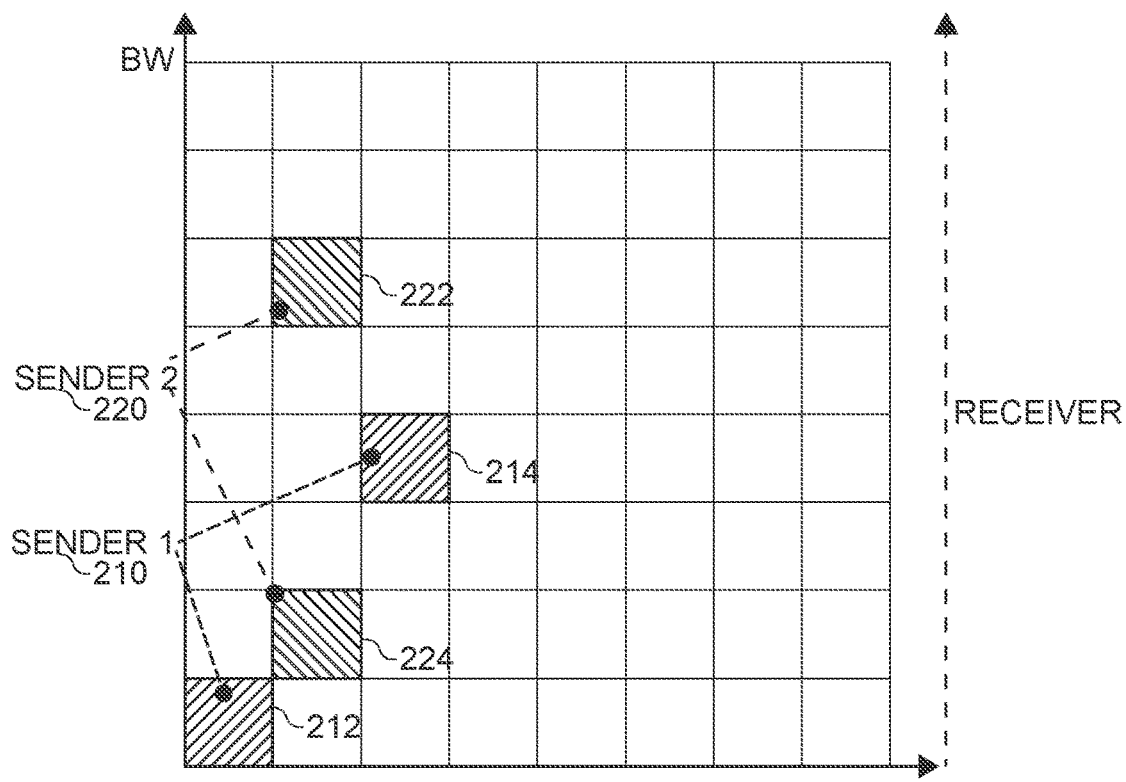
FIGS. 2a and 2b show schematic diagrams of examples of a use of radio resources.
Figure 2B:
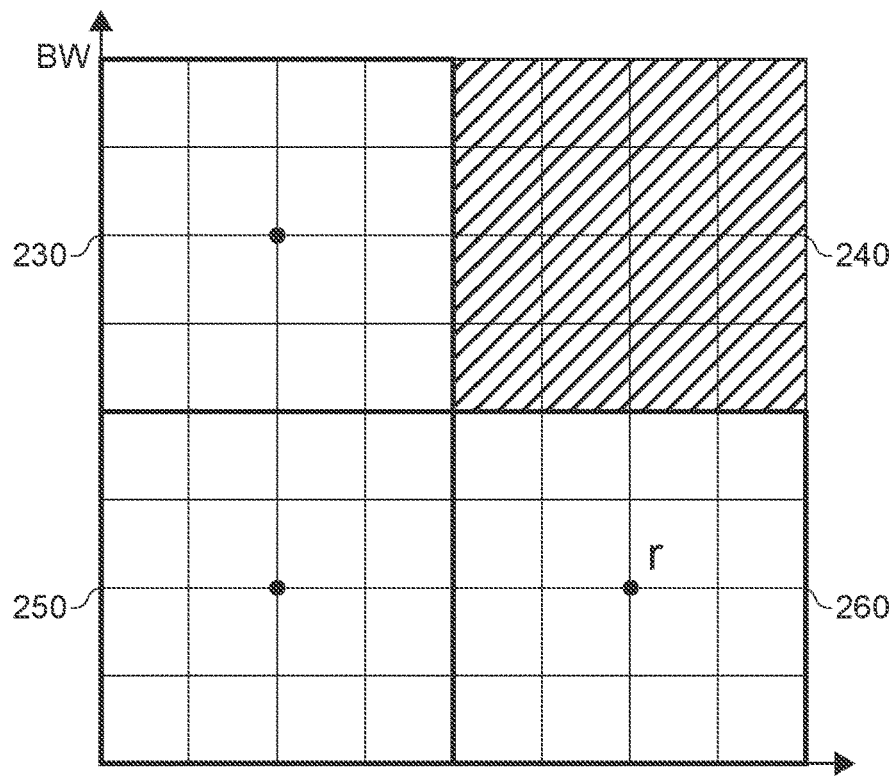

In a second approach, a method or mechanism for organizing the resources may be selected among a) Sense Resources b) Individual (personal) "random" selection based on random preferences FIGS. 2a and 2b show schematic diagrams of examples of a use of radio resources. FIGS. 2a and 2b each show a graph depicting a plurality of resource blocks that can be used for wireless communication. The x-axis denotes the time (in slots), while the y-axis denotes the bandwidth (BW).

In FIG. 2a, Sender 1 210 and Sender 2 220 perform a wireless communication using resource blocks of the plurality of resources blocks. Sender 1 uses two resources blocks 212; 214 that use different frequencies and that use different time slots (e.g., using frequency interleaving), and Sender 2 uses two resource blocks 222; 224 that use the same time slot, but different resource blocks (e.g., using frequency hopping). The transmitted wireless communication is received by a receiver.

In FIG. 2b, the plurality of resource blocks are partitioned into four quadrants, 230; 240; 250; 260, each comprising a subset of the plurality of resource blocks. For example, the four quadrants may be pre-assigned using sensing-based semi-persistent scheduling (e.g., SB-SPS), e.g., so that quadrants 230; 250 and 260 are to be used for random access on the sidelink (e.g., for the wireless communication), and quadrant 240 is to be used for another form of communication, e.g., periodic beacons.

As already mentioned, in disclosed embodiments the respective methods may be implemented as computer programs or codes, which can be executed on a respective hardware. Hence, another disclosed embodiment is a computer program having a program code for performing at least one of the above methods, when the computer program is executed on a computer, a processor, or a programmable hardware component. A further disclosed embodiment is a computer readable storage medium storing instructions which, when executed by a computer, processor, or programmable hardware component, cause the computer to implement one of the methods described herein.

A person of skill in the art would readily recognize that operations of various above-described methods can be performed by programmed computers, for example, positions of slots may be determined or calculated. Herein, some disclosed embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The disclosed embodiments are also intended to cover computers programmed to perform the methods described herein or (field) programmable logic arrays ((F)PLAs) or (field) programmable gate arrays ((F)PGAs), programmed to perform the operations of the above-described methods.

The description and drawings merely illustrate the principles of the disclosed embodiments. It will thus be appreciated that those skilled in the art will be able to devise various arrangements that, although not explicitly described or shown herein, embody the principles of the disclosed embodiments and are included within its spirit and scope. Furthermore, all examples recited herein are principally intended expressly to be only for pedagogical purposes to aid the reader in understanding the principles of the disclosed embodiments and the concepts contributed to furthering the art, and are to be construed as being without limitation to such specifically recited examples and conditions. Moreover, all statements herein reciting principles and exemplary embodiments of the disclosure, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosed embodiments. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate disclosed embodiment. While each claim may stand on its own as a separate disclosed embodiment, it is to be noted that—although a dependent claim may refer in the claims to a specific combination with one or more other claims—other disclosed embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having methods or mechanisms for performing each of the respective operations of these methods.

LIST OF REFERENCE SIGNS

10 Apparatus
12 Interface
14 Control module
100 Transportation vehicle
110 Determining, whether a transportation vehicle executing the method is in coverage or out of coverage
112 Sensing an availability of radio resources
114 Receiving one or more wireless messages
120 Selecting one or more methods or mechanisms
130 Determining one or more radio resources
140 Performing a wireless communication
200 One or more further transportation vehicles
210 Sender 1
212; 214 Resource blocks
220 Sender 2
222; 224 Resource blocks
230; 240; 250; 260 Quadrants of schematic diagram
300 Mobile communication system

The invention claimed is:

1. An apparatus for determining one or more radio resources to be used for performing a wireless communication over a sidelink of a mobile communication system, the apparatus comprising:
    an interface for communicating in the mobile communication system; and
    a control module configured to:
        determine whether a transportation vehicle comprising the apparatus is in coverage or out of coverage of a base station of the mobile communication system,
        select from one or more ways to improve transmission reliability of the wireless communication over the sidelink in response to the transportation vehicle being out of coverage, wherein the ways include using error correction, using frequency interleaving, using listen-before-talk and using a vehicle-specific random seed to determine the one or more radio resources for the wireless communication over the sidelink, and
        determine the one or more radio resources to be used for performing the wireless communication over the sidelink of the mobile communication system using the selection.

2. The apparatus of claim 1, wherein an availability of radio resources is sensed and wherein the one or more ways to improve the transmission reliability of the wireless communication over the sidelink are selected based on the sensed availability of radio resources.

3. The apparatus of claim 2, wherein the availability of radio resources is sensed for a position or trajectory of the transportation vehicle executing the method.

4. The apparatus of claim 2, wherein the wireless communication over the sidelink of the mobile communication system is a communication between the transportation vehicle and one or more further transportation vehicles, the method comprising receiving one or more wireless messages having a content that is indicative of the availability of the radio resources from the one or more further transportation vehicles.

5. The apparatus of claim 1, wherein the ways to improve the transmission reliability comprise using error correction for the wireless communication over the sidelink.

6. The apparatus of claim 1, wherein the ways to improve the transmission reliability comprise using one of Reed-Solomon codes, Bose-Chaudhuri-Hocquenghem-codes, Reed-Muller-codes and polar codes for the wireless communication over the sidelink.

7. The apparatus of claim 1, wherein the ways to improve the transmission reliability comprises using resource hopping for the wireless communication over the sidelink.

8. The apparatus of claim 1, wherein the ways to improve the transmission reliability comprises using frequency interleaving for the wireless communication over the sidelink.

9. The apparatus of claim 1, wherein the ways to improve the transmission reliability comprises using listen-before-talk for the wireless communication over the sidelink.

10. The apparatus of claim 1, wherein the ways to improve the transmission reliability comprises using a vehicle-specific random seed to determine the one or more radio resources.

11. The apparatus of claim 1, wherein the wireless communication over the sidelink of the mobile communication system is a communication between the transportation vehicle and one or more further transportation vehicles, and/or
wherein the mobile communication system is a vehicular mobile communication system.

12. The apparatus of claim 11, wherein the wireless communication is one of intra-cluster communication, inter-cluster communication, intra-platoon communication and inter-platoon communication between the transportation vehicle and the one or more further transportation vehicles.

13. The apparatus of claim 1, wherein the selection of the one or more ways to improve the transmission reliability of the wireless communication over the sidelink is forgone in response to a determination that the transportation vehicle being in coverage of a base station of the mobile communication system.

14. A non-transitory computer readable medium including a computer program having a program code for performing functionality of the control module recited in claim 1, when the computer program is executed on a computer, a processor, or a programmable hardware component.

15. A method for determining one or more radio resources to be used for performing a wireless communication over a sidelink of a mobile communication system, the method comprising:
determining whether a transportation vehicle executing the method is in coverage or out of coverage of a base station of the mobile communication system;
selecting from one or more ways to improve transmission reliability of the wireless communication over the sidelink in response to the transportation vehicle being out of coverage, wherein the ways include using error correction, using frequency interleaving, using listen-before-talk and using a vehicle-specific random seed to determine the one or more radio resources for the wireless communication over the sidelink; and
determining the one or more radio resources to be used for performing the wireless communication over the sidelink of the mobile communication system using the selection.

16. The method of claim 15, further comprising sensing an availability of radio resources, wherein the one or more ways to improve the transmission reliability of the wireless communication over the sidelink are selected based on the sensed availability of radio resources.

17. The method of claim 16, wherein the availability of radio resources is sensed for a position or trajectory of the transportation vehicle executing the method.

18. The method of claim 16, wherein the wireless communication over the sidelink of the mobile communication system is a communication between the transportation vehicle and one or more further transportation vehicles, the method comprising receiving one or more wireless messages having a content that is indicative of the availability of the radio resources from the one or more further transportation vehicles.

19. The method of claim 15, wherein the ways to improve the transmission reliability comprise using error correction for the wireless communication over the sidelink.

20. The method of claim 15, wherein the ways to improve the transmission reliability comprise using one of Reed-Solomon codes, Bose-Chaudhuri-Hocquenghem-codes, Reed-Muller-codes and polar codes for the wireless communication over the sidelink.

21. The method of claim 15, wherein the ways to improve the transmission reliability comprises using resource hopping for the wireless communication over the sidelink.

22. The method of claim 15, wherein the ways to improve the transmission reliability comprises using frequency interleaving for the wireless communication over the sidelink.

23. The method of claim 15, wherein the ways to improve the transmission reliability comprises using listen-before-talk for the wireless communication over the sidelink.

24. The method of claim 15, wherein the ways to improve the transmission reliability comprises using a vehicle-specific random seed to determine the one or more radio resources.

25. The method of claim 15, wherein the wireless communication over the sidelink of the mobile communication system is a communication between the transportation vehicle and one or more further transportation vehicles, and/or
wherein the mobile communication system is a vehicular mobile communication system.

26. The method of claim 25, wherein the wireless communication is one of intra-cluster communication, inter-cluster communication, intra-platoon communication and inter-platoon communication between the transportation vehicle and the one or more further transportation vehicles.

27. The method of claim 15, wherein the selection of the one or more ways to improve the transmission reliability of the wireless communication over the sidelink is forgone in response to a determination that the transportation vehicle being in coverage of a base station of the mobile communication system.

* * * * *